(12) United States Patent
Nagasawa

(10) Patent No.: US 11,718,258 B2
(45) Date of Patent: Aug. 8, 2023

(54) OCCUPANT PROTECTION DEVICE FOR VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 65 days.

(21) Appl. No.: 17/220,081

(22) Filed: Apr. 1, 2021

(65) Prior Publication Data

US 2021/0339697 A1 Nov. 4, 2021

(30) Foreign Application Priority Data

May 1, 2020 (JP) .................................. 2020-081572

(51) Int. Cl.
*B60R 21/207* (2006.01)
*B60R 21/233* (2006.01)

(52) U.S. Cl.
CPC .......... *B60R 21/207* (2013.01); *B60R 21/233* (2013.01)

(58) Field of Classification Search
CPC ..... B60R 21/207; B60R 21/23; B60R 21/233; B60R 21/23184; B60R 2021/23107; B60R 2021/23388
See application file for complete search history.

(56) References Cited

U.S. PATENT DOCUMENTS

| 11,084,449 | B2 * | 8/2021 | Nagasawa | B60R 21/231 |
| 11,104,287 | B2 * | 8/2021 | Kobayashi | B60R 21/237 |
| 2018/0290619 | A1 * | 10/2018 | Kitagawa | B60R 21/2338 |
| 2019/0248322 | A1 * | 8/2019 | Herzenstiel | B60R 21/207 |

FOREIGN PATENT DOCUMENTS

| EP | 3395619 B1 * | 11/2019 | ........... B60R 21/207 |
| JP | 2017-178148 A | 10/2017 | |
| WO | WO-2019244763 A1 * | 12/2019 | |

OTHER PUBLICATIONS

WO-2019244763-A1, Okada, English translation (Year: 2019).*

* cited by examiner

*Primary Examiner* — James M Dolak
*Assistant Examiner* — Matthew James O'Neill
(74) *Attorney, Agent, or Firm* — McGinn I.P. Law Group, PLLC.

(57) ABSTRACT

An occupant protection device for a vehicle includes right and left bag bodies and an inflator. The right and left bag bodies are accommodated along at least both right and left side portions of a seat back portion of a seat of the vehicle. Each of the right and left bag bodies is configured to be deployed between both ends thereof fixed to the seat. The inflator is configured to deploy the right and left bag bodies. Each of the right and left bag bodies is accommodated in a state of being wound with the both ends located outside. The right and left bag bodies are configured to be deployed in such a manner that the right and left bag bodies are unwound from a state of being accommodated to reach positions in front of an upper body of an occupant to be seated on the seat.

10 Claims, 12 Drawing Sheets

OCCUPANT PROTECTION DEVICE FOR VEHICLE

CROSS-REFERENCE TO RELATED APPLICATIONS

The present application claims priority from Japanese Patent Application No. 2020-081572 filed on May 1, 2020, the entire contents of which are hereby incorporated by reference.

BACKGROUND

The disclosure relates to an occupant protection device for a vehicle.

In vehicles such as automobiles, a seatbelt device and an airbag device are used to protect an occupant on board (Japanese Unexamined Patent Application Publication (JP-A) No. 2017-178148).

A seatbelt goes across a front side of an upper body of the occupant to restrain an occupant seated on a seat from being displaced out of the seat. An airbag device is deployed around an occupant seated on the seat to absorb a large impact that may act on the occupant who is displaced out of a seated position of the seat. With these occupant protection devices, the vehicle can protect the occupant on board.

SUMMARY

An aspect of the disclosure provides an occupant protection device for a vehicle. The occupant protection device includes a right bag body, a left bag body, and an inflator. The right bag body and the left bag body are accommodated along at least both right and left side portions of a seat back portion of a seat of the vehicle. Each of the right and left bag bodies is configured to be deployed between both ends thereof fixed to the seat. The inflator is configured to deploy the right bag body and the left bag body. Each of the right bag body and the left bag body is accommodated in a state of being wound with the both ends located outside. The right bag body and the left bag body are configured to be deployed in such a manner that the right bag body and the left bag body are unwound from a state of being accommodated to reach positions in front of an upper body of an occupant to be seated on the seat.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

A seatbelt, for example, locally restrains an occupant. Therefore, even though the seatbelt protects the occupant from a large impact, it is difficult to say that there is no possibility that a load is locally applied to the occupant.

In addition, a bag body can appropriately absorb an impact in an estimated collision form, but it is not always possible to appropriately absorb an impact in a collision form different from the estimated collision form. For example, it is difficult for a bag body configured to be deployed in front of the occupant seated on a seat to appropriately absorb the impact on the occupant who falls laterally on the seat due to a side collision and is displaced out of the seated position on the seat. Therefore, in a vehicle, plural airbag devices corresponding to various collision forms are provided around the seat.

In addition, the bag body is deployed at a position slightly away from, for example, the upper body of the occupant at the seated position on the seat in order to correspond to various occupant body shapes. The deployed bag body begins to function so as to absorb the impact after, for example, the upper body of the occupant clearly moves. In this case, the deployed bag body is to absorb a large impact on, for example, the upper body of the occupant who already begins to move.

As described above, it is desirable to improve an occupant protection device in a vehicle to appropriately absorb an impact in accordance with a collision form or a seated position of the occupant of the vehicle.

Figure 1A:
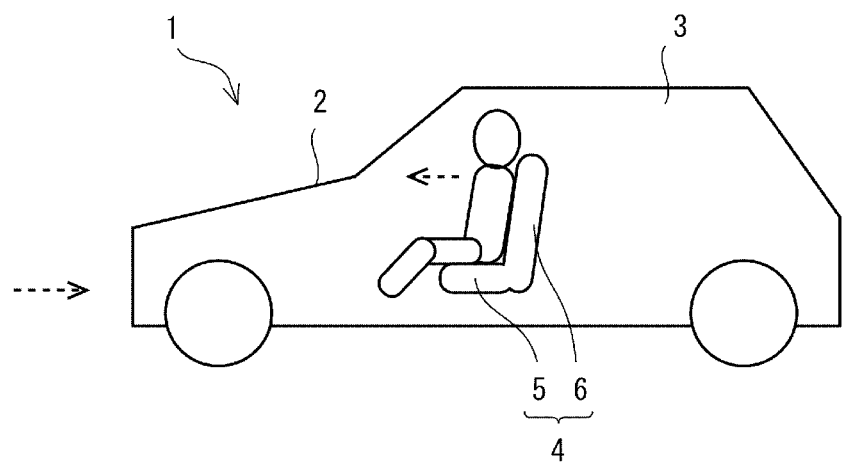
FIGS. 1A and 1B are diagrams of an automobile according to an embodiment of the disclosure.
Figure 1B:
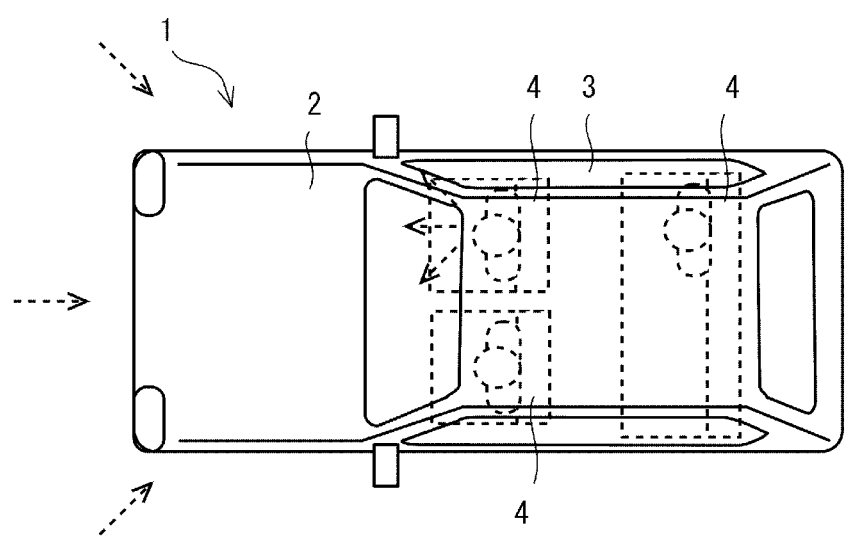

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. FIGS. 1A and 1B are diagrams of an automobile 1 according to the embodiment of the disclosure. The automobile 1 is an example of a vehicle. The vehicle also includes, for example, a bus and a train for public transport, personal mobility for personal use, and a gantry device for carrying the personal mobility. The automobile 1 may be one that can be manually driven or self-drive.

FIG. 1A is a schematic side view of the automobile 1. FIG. 1B is a top view of the automobile 1 of FIG. 1A. FIGS. 1A and 1B illustrate an occupant riding in the automobile 1, as well as the automobile 1.

The automobile 1 includes a vehicle body 2. The vehicle body 2 includes a vehicle cabin 3 in which plural seats 4 face forward. The seat 4 includes a seat portion 5 and a seat back portion 6 erected upward from a rear edge of the seat portion 5. The occupant rests the waist and the thighs on the seat portion 5, and sits on the seat 4 with the back of the upper body against the seat back portion 6.

In such an automobile 1, a seatbelt device and an airbag device is used to protect the occupant on board.

The seatbelt device includes a seatbelt that goes across a front side of the upper body of the occupant seated on the seat 4. The seatbelt restrains the occupant in the seat 4 such that the occupant seated on the seat 4 is not displaced out of the seat 4 at a time of a collision.

The airbag device includes a bag body configured to be deployed around the occupant seated on the seat 4. The bag body is deployed, for example, in front of the seat 4. The upper body of the occupant falls forward, for example, from a seated position with her back attaching to the seat 4 at the time of the collision. The occupant comes into contact with the deployed bag body, so that the deployed bag body absorbs the impact. The air bag can absorb the impact acting on the occupant.

With the seatbelt device and the airbag device, the automobile 1 can protect the occupant on board.

However, for example, the seatbelt locally restrains the chest of the occupant. Therefore, it cannot be said that there is no possibility that a local load is applied to the chest of the occupant when a large impact is input.

In addition, the bag body can absorb an impact in an assumed collision form by being deployed in an appropriate position and timing. However, it is not always possible to appropriately absorb an impact in a collision form different from the assumed collision form. For example, it is difficult for the bag body configured to be deployed in front of the occupant seated on the seat 4 to absorb an impact on an occupant who falls laterally on the seat 4 due to a side collision and who is displaced out of the seated position of the seat 4 toward a vehicle width direction. Therefore, in the automobile 1, plural airbag devices corresponding to plural collision forms are provided around the seat 4. A large number of airbag devices are provided around the seat 4 to correspond to the collision forms. In this case, a structure and control of the devices that protects the occupant is complicated.

As described above, an occupant protection device 10 is to be further improved.

Figure 2A:
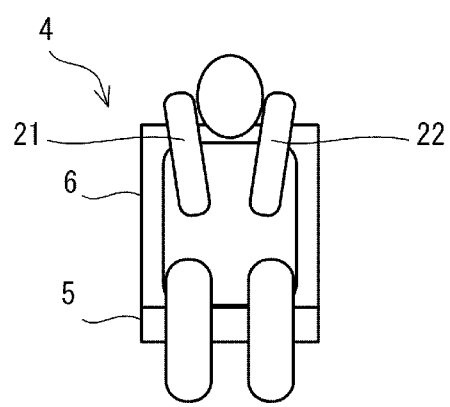
FIGS. 2A to 2C are diagrams illustrating a basic deployment state in which deployed are a right bag body and a left bag body of an occupant protection device that may be provided in the automobile of FIGS. 1A and 1B.
Figure 2B:
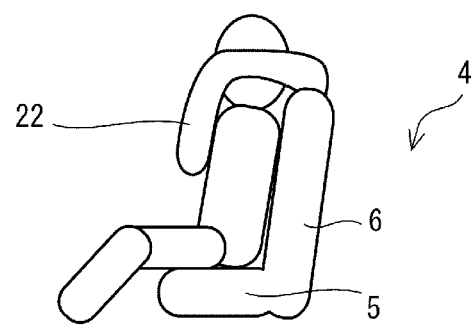
Figure 2C:
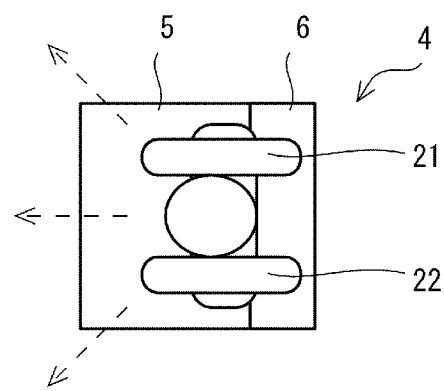

FIGS. 2A to 2C are diagrams illustrating a basic deployment state in which deployed are a right bag body 21 and a left bag body 22 of the occupant protection device 10 that may be provided in the automobile 1 of FIGS. 1A and 1B. FIG. 2A to 2C illustrate a basic principle of an occupant protection by the right bag body 21 and the left bag body 22.

The right bag body 21 of FIGS. 2A to 2C is deployed so as to project forward from an upper right portion of the seat back portion 6 of the seat 4 and further project downward by an inflow of a high-pressure gas from an inflator 23. In this case, the right bag body 21 is deployed so as to reach a position in front of the upper body of the occupant seated on the seat 4 from the upper right portion of the seat back portion 6 of the seat 4 through above the right shoulder of the occupant.

Figure 3:
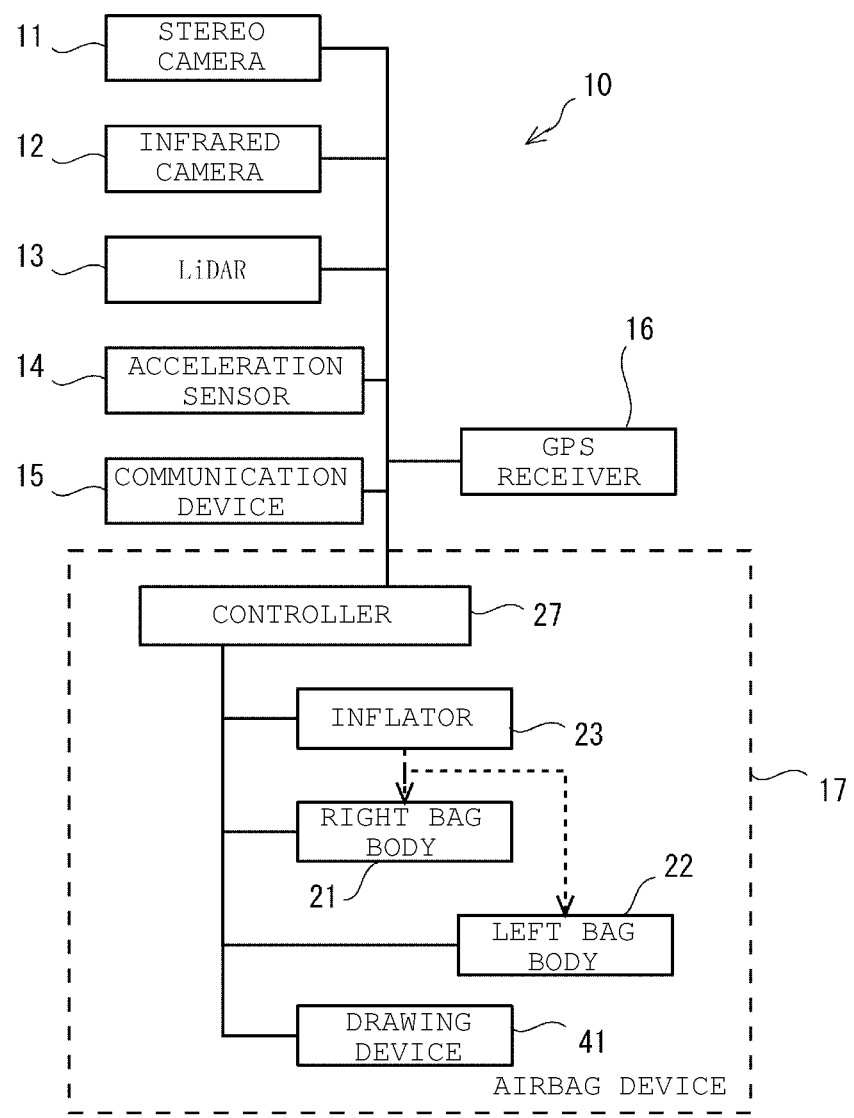
FIG. 3 is a diagram of a control system of the occupant protection device provided in the automobile of FIGS. 1A and 1B.

The left bag body 22 is deployed so as to project forward from an upper left portion of the seat back portion 6 of the seat 4 and further project downward by the inflow of the high-pressure gas from the inflator 23 illustrated in FIG. 3. In this case, the left bag body 22 is deployed so as to reach a position in front of the upper body of the occupant seated on the seat 4 from the upper left portion of the seat back portion 6 of the seat 4 through above the left shoulder of the occupant.

Accordingly, the right bag body 21 and the left bag body 22 provided in the seat 4 of the automobile 1 are respectively deployed by the inflator 23 to reach the positions in front of the upper body of the occupant seated on the seat 4 from the upper right portion and the upper left portion of the seat back portion 6 of the seat 4 through above the right shoulder and the left shoulder of the occupant. The right bag body 21 and the left bag body 22 may communicate with each other. The upper body of the occupant seated on the seat 4 is restrained by the right bag body 21 and the left bag body 22 which are in close contact with a front surface of the upper body of the occupant, and can be maintained in this state in the event of the collision. The deployed right bag body 21 and the deployed left bag body 22 can restrain the occupant so as to maintain a state where the occupant is seated on the seat 4, not only when an impact is input to the automobile 1 from a forward direction, but also when an impact is input to the automobile 1 from a diagonal forward direction. Further, the front surface of the upper body of the occupant is restrained by the deployed right bag body 21 and the deployed left bag body 22. Compared to a case where the seatbelt restrains the front surface of the upper body of the occupant, the deployed right bag body 21 and the deployed left bag body 22 are less likely to strongly and locally act on a part of the front surface of the upper body with a force that restrains the occupant.

In the embodiment, the occupant protection device 10 that is expected to have such an effect practically will be described.

FIG. 3 is a diagram of a control system of the occupant protection device 10 provided in the automobile 1 of FIGS. 1A and 1B.

The occupant protection device 10 of FIG. 3 includes a stereo camera 11, an infrared camera 12, a LiDAR 13, an acceleration sensor 14, a communication device 15, a GPS receiver 16, and an airbag device 17. The airbag device 17 includes the right bag body 21, the left bag body 22, the inflator 23, a drawing device 41, and a controller 27 to which the elements 21, 22, 23, and 41 are coupled. The drawing device 41 draws tethers 42, which are illustrated in FIG. 5, coupled to the right bag body 21 and the left bag body 22. Sensors and devices of the occupant protection device 10 may be coupled to the controller 27 over a vehicle network (not illustrated) provided in the automobile 1.

The stereo camera 11 faces forward, for example, in a front part of the vehicle cabin 3. The stereo camera 11 includes plural imaging devices arranged in the vehicle width direction. The stereo camera 11 captures an image of a person outside the vehicle and the like by the plural imaging devices. The stereo camera 11 may calculate a direction of the captured person outside the vehicle and a distance to the captured person outside the vehicle, based on the vehicle body 2. The stereo camera 11 may calculate, based on a position of the person outside the vehicle that is a subject in images captured by the plural imaging devices, the direction of the subject and the distance to the subject by triangulation, for example. The stereo camera 11 may calculate (i) whether the subject moves, (ii) a moving direction of the subject, (iii) a moving speed of the subject, and the like, based on a change in position of the subject in the images which are captured at different times.

The infrared camera 12 faces forward in the front part of the vehicle cabin 3 like the stereo camera 11, for example. The infrared camera 12 obtains an infrared image by capturing the person outside the vehicle and other movable bodies.

The LiDAR 13 faces forward, for example, in the front part of the vehicle body 2. The LiDAR 13 emits light forward, and acquires a direction of a subject, a distance to the subject, the speed of the subject, and the like, based on reflected light from the person outside the vehicle ahead of the vehicle body 2.

The acceleration sensor 14 is provided on the vehicle body 2. Acceleration applied to the acceleration sensor 14 is detected. When the vehicle body 2 comes into contact with a movable body such as a person, the acceleration sensor 14 detects a large acceleration that does not occur during normal running. In this case, the acceleration sensor 14 may output a signal indicating that a collision is detected. In this case, the acceleration sensor 14 serves as a collision detector that predicts or detects contact between the vehicle body 2 and the other movable body.

The communication device 15 communicates with other communication devices of other movable bodies (for example, another automobile 1 and a pedestrian), a base station disposed along a road, and the like by wireless communication. The communication device 15 may acquire current positions, moving directions, moving speeds, and the like of the other movable bodies from the other communication devices.

The GPS receiver 16 receives a radio wave from a GPS satellite and the like, and acquires a current position, a moving speed, and the like of a host vehicle.

The right bag body 21 and the left bag body 22 of the airbag device 17 may have a smooth surface formed of, for example, at least one selected from the group consisting of nylon and other resin fibers. Each of the right bag body 21 and the left bag body 22 may be a rod-shaped bag body that is bent as will be described later.

The inflator 23 is coupled to the right bag body 21 and the left bag body 22. The inflator 23 generates the high-pressure gas in response to an ignition signal and supplies the high-pressure gas to the right bag body 21 and the left bag body 22.

The controller 27 includes, for example, a central processing unit (CPU) and an electric control unit (ECU). For example, the controller 27 may be provided in the automobile 1 as a CPU dedicated to the airbag device 17 or may be provided in the automobile 1 as a CPU common to various protection devices provided in the automobile 1. The CPU reads a program from a storage such as a read only memory (ROM) and executes the program. Accordingly, the CPU serves as the controller 27 of the airbag device 17. The controller 27 of the airbag device 17 determines a possibility of a collision of the automobile 1 based on detection information from the collision detectors such as the stereo camera 11, the infrared camera 12, the LiDAR 13, the acceleration sensor 14, and the communication device 15, and detects the collision. The CPU outputs the ignition signal to the inflator 23 based on either one of the determined collision and the detected collision. Accordingly, the airbag device 17 executes the occupant protection with the deployed right bag body 21 and the deployed left bag body 22.

Figure 4:
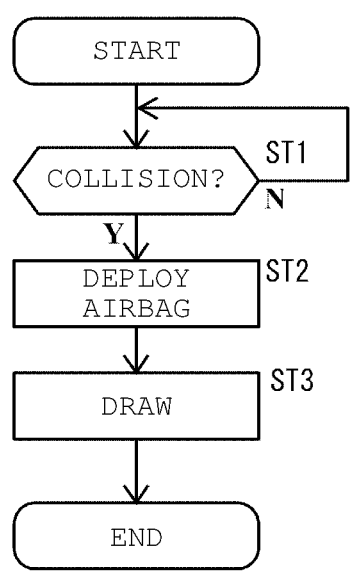
FIG. 4 is a flowchart of an occupant protection process by a controller of FIG. 3.

FIG. 4 is a flowchart of an occupant protection process by the controller 27 of FIG. 3.

The CPU serving as the controller 27 repeatedly executes the process of FIG. 4, for example, when the automobile 1 is traveling or when the occupant rides on the automobile 1.

In step ST1, the CPU determines whether the collision is detected. When the contact between the vehicle body 2 and the other movable body is not predicted or detected, the CPU repeats step ST1. When the contact between the vehicle body 2 and the other movable body is predicted or detected, the CPU determines that the collision is detected and proceeds to step ST2.

In step ST2, the CPU deploys the airbag device 17. The CPU outputs the ignition signal to the inflator 23. Accordingly, the right bag body 21 and the left bag body 22 of the airbag device 17 start to be deployed.

In step ST3, the CPU operates the drawing device 41 to draw the tethers 42. Accordingly, a lower end of the right bag body 21 and a lower end of the left bag body 22 are drawn under the seat portion 5 of the seat 4. Thereafter, the CPU ends the process.

Accordingly, when the collision of the automobile 1 is detected or predicted, the CPU serving as the controller 27 can deploy the right bag body 21 and the left bag body 22 of the occupant protection device 10.

Figure 5A:
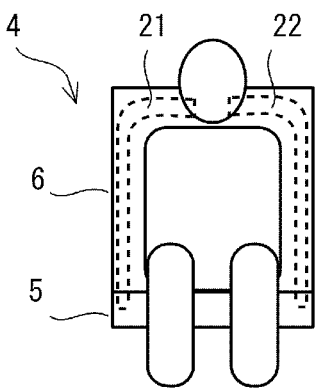
FIGS. 5A to 5C are diagrams illustrating a state in which the right bag body and the left bag body of the occupant protection device according to the embodiment of the disclosure are accommodated in a seat.
Figure 5B:
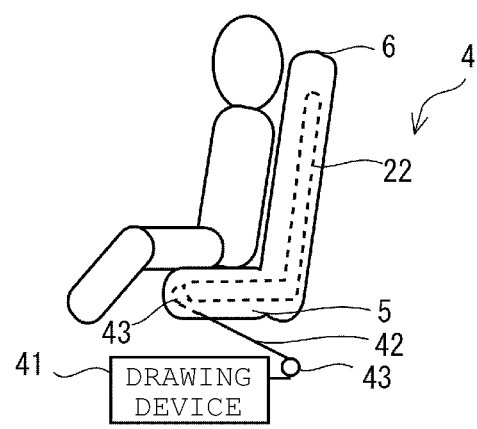
Figure 5C:
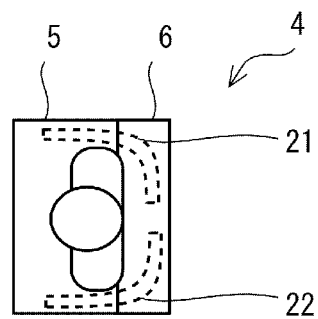

FIGS. 5A to 5C are diagrams illustrating a state in which the right bag body 21 and the left bag body 22 of the occupant protection device 10 according to the embodiment of the disclosure are accommodated in the seat 4.

FIG. 5A is a front view of the seat 4. FIG. 5B is a side view of the seat 4. FIG. 5C is a top view of the seat 4.

As illustrated in FIGS. 6 and 7, the right bag body 21 of the embodiment is an elongated bag body that can be deployed into a substantially rod shape bent at a bent portion 31 as will be described later. As illustrated in FIGS. 5A to 5C, one end of the elongated right bag body 21 is fixed at a position near a center of the upper right portion of the seat back portion 6 of the seat 4, and the other end of the elongated right bag body 21 is fixed to a front right portion of the seat portion 5 of the seat 4. The right bag body 21 is embedded in the seat 4 from the seat back portion 6 to the seat portion 5 of the seat 4 along a right edge of the seat 4. The left bag body 22 is an elongated bag body which can be deployed into a substantially rod shape bent at the bent portion 31 as will be described later. One end of the elongated left bag body 22 is fixed at a position near a center of the upper left portion of the seat back portion 6 of the seat 4, and the other end of the of the elongated left bag body 22 is fixed to a front left portion of the seat portion 5 of the seat 4. The left bag body 22 is embedded in the seat 4 from the seat back portion 6 to the seat portion 5 of the seat 4 along a left edge of the seat 4.

Figure 6A:
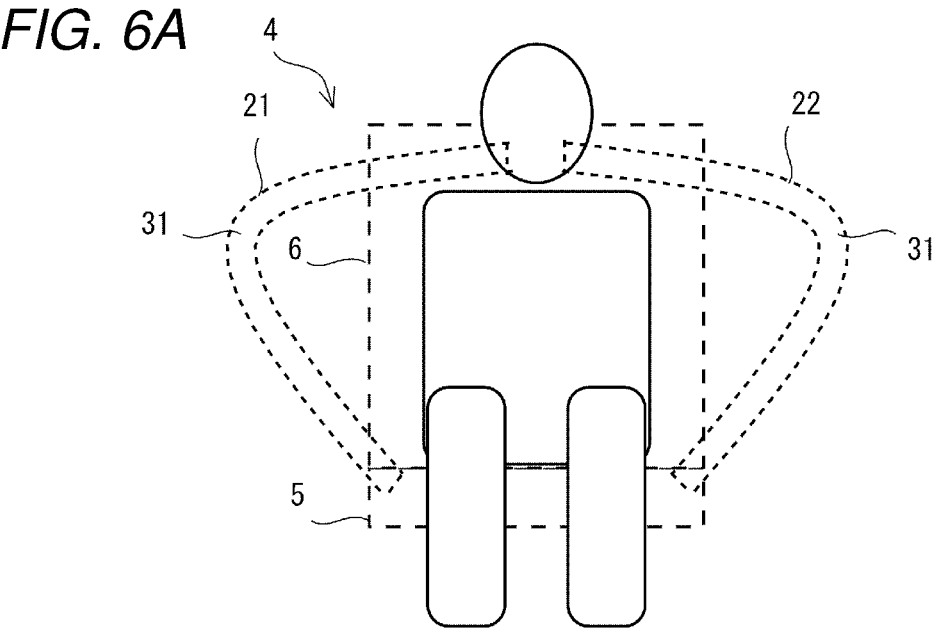
FIGS. 6A and 6B are diagrams illustrating a state in which the right bag body and the left bag body of FIGS. 5A to 5C are deployed to the right and left of the seat.
Figure 6B:
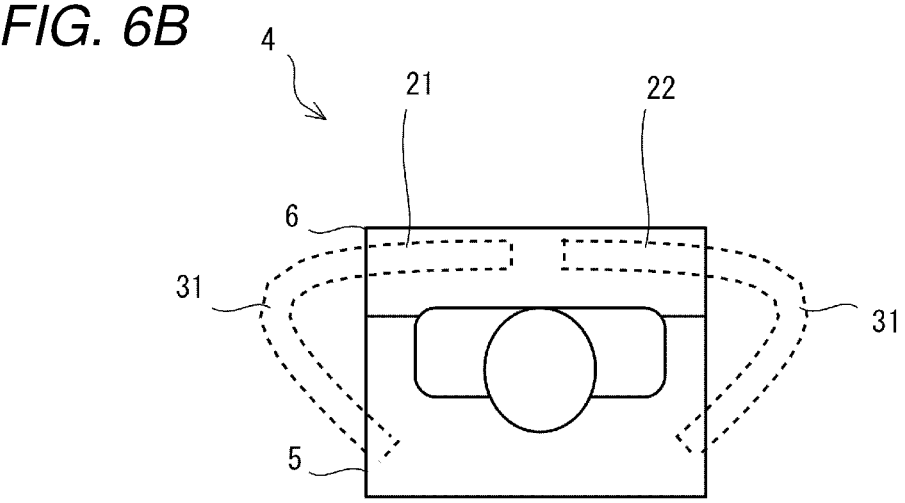

FIGS. 6A and 6B are diagrams illustrating a state in which the right bag body 21 and the left bag body 22 of FIGS. 5A to 5C are expanded to the right and left of the seat 4.

FIG. 6A is a front view of the seat 4. FIG. 6B is a top view of the seat 4.

As illustrated in FIGS. 6A and 6B, on the right side of the seat 4, the right bag body 21 can be expanded in the substantially rod shape bent at the bent portion 31.

On the left side of the seat 4, the left bag body 22 can be expanded in the substantially rod shape bent at the bent portion 31.

The right bag body 21 and the left bag body 22 may break a seat cover that forms a surface of the seat 4 with a pressure at a time of deploying, and project out of the seat 4 as illustrated in FIGS. 6A and 6B. The right bag body 21 and the left bag body 22 projecting out of the seat 4 can be deployed to the right and the left from the seat 4 in a bent state. The right bag body 21 deployed from the seat 4 to the right may be deployed so as to extend from the upper right portion of the seat back portion 6 of the seat 4 to a right portion of the seat portion 5 of the seat 4. The left bag body 22 deployed from the seat 4 to the left may be deployed so as to extend from the upper left portion of the seat back portion 6 of the seat 4 to a left portion of the seat portion 5 of the seat 4.

When the right bag body 21 is embedded along the right edge of the seat 4 from the seat back portion 6 to the seat portion 5 of the seat 4 as described above, a length of the right bag body 21 after breaking the seat cover and projecting out of the seat 4 is longer than a direct distance from the upper right portion of the seat back portion 6 of the seat 4 to the front right portion of the seat portion 5 to which the two ends of the right bag body 21 are respectively fixed. The right bag body 21 is deployed with a length longer than the direct distance between the two fixed points. Therefore, if the right bag body 21 is simply deployed, the right bag body 21 is deployed with bent and it is difficult for the right bag body 21 to be in close contact with and restrain the occupant as illustrated in FIGS. 2A to 2C.

Similarly, when the left bag body 22 is embedded along the left edge of the seat 4 from the seat back portion 6 to the seat portion 5 of the seat 4, a length of the left bag body 22 after breaking the seat cover and projecting out of the seat 4 is longer than a direct distance from the upper left portion of the seat back portion 6 of the seat 4 to the front left portion of the seat portion 5 to which the two ends of the left bag body 22 are respectively fixed. The left bag body 22 is deployed with a length longer than the direct distance between the two fixed points. Therefore, if the left bag body 22 is simply deployed, the left bag body 22 is deployed with bent and it is difficult for the left bag body 22 to be in close contact with and restrain the occupant as illustrated in FIGS. 2A to 2C.

Then, the right bag body 21 and the left bag body 22 that are deployed on the right and the left of the occupant with bent are difficult to be deployed so as to be in close contact with the front surface and both right and left shoulders of the occupant seated on the seat 4.

FIGS. 7A to 7E are diagrams illustrating how to wind the right bag body 21 and the left bag body 22 in FIGS. 5A to 5C.

Figure 7A:
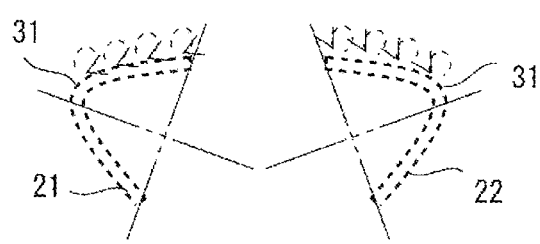
FIGS. 7A to 7E are diagrams illustrating how to wind the right bag body and the left bag body in FIGS. 5A to 5C.

FIG. 7A illustrates an arrangement of the right bag body 21 and the left bag body 22 corresponding to FIGS. 5A to 5C. FIG. 7A is a view of the right bag body 21 and the left bag body 22 provided on the seat 4 as viewed from an upper front side. In FIG. 7A, the right bag body 21 and the left bag body 22 are expanded to the right side and the left side of the seat 4.

The right bag body 21 and the left bag body 22 each includes the bent portion 31 at a position upper than a center thereof that is equidistant from both ends thereof fixed to the seat 4.

Figure 7B:
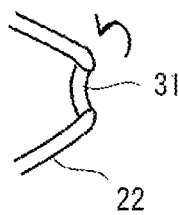
Figure 7C:
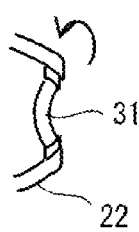
Figure 7D:
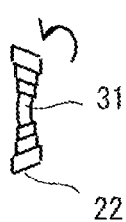

FIGS. 7B to 7D are diagrams illustrating how to wind the left bag body 22 of FIG. 7A.

The left bag body 22 provided on the left side of the seat 4 is wound from the bent portion 31. For example, the bent portion 31 of the left bag body 22 is turned rearward of both ends of the left bag body 22 so as to wind the left bag body 22 rearward. Finally, the left bag body 22 is wound in a substantially rod shape extending between both ends thereof. The left bag body 22 is wound rearward such that both ends are located on the outside.

Similarly, the right bag body 21 is started to be wound from the bent portion 31, and the bent portion 31 of the right bag body 21 is turned rearward of both end portions of the right bag body 21 so as to wind the right bag body 21 rearward. Finally, the right bag body 21 is wound in a substantially rod shape extending between both ends thereof. The right bag body 21 is wound rearward such that both ends thereof are located on the outside.

Figure 7E:
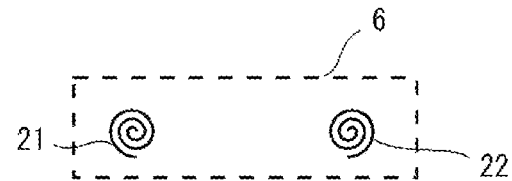

FIG. 7E is a diagram illustrating the seat portion 5 of the seat 4 as viewed from above. As illustrated in FIG. 7E, the left bag body 22, which is wound rearward by turning the bent portion 31 rearward of both ends thereof so as to be located on the inside, is accommodated in the seat portion 5 of the seat 4 in a state where the left bag body 22 is turned counterclockwise. In contrast, the right bag body 21, which is wound rearward by turning the bent portion 31 rearward of both ends thereof so as to be located on the inside, is accommodated in the seat portion 5 of the seat 4 in a state where the right bag body 21 is turned clockwise.

Figure 8A:
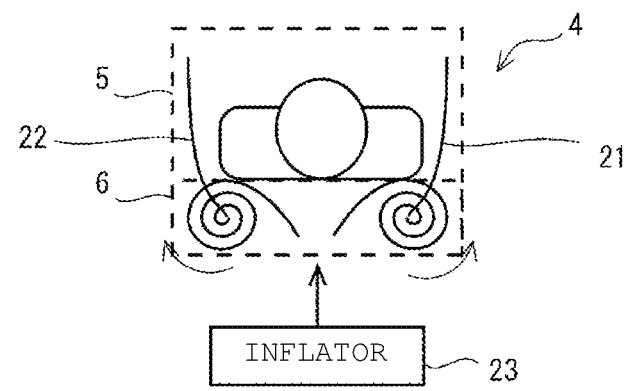
FIGS. 8A to 8C are diagrams illustrating a procedure of deploying the right bag body and the left bag body of FIGS. 5A to 5C.
Figure 8B:
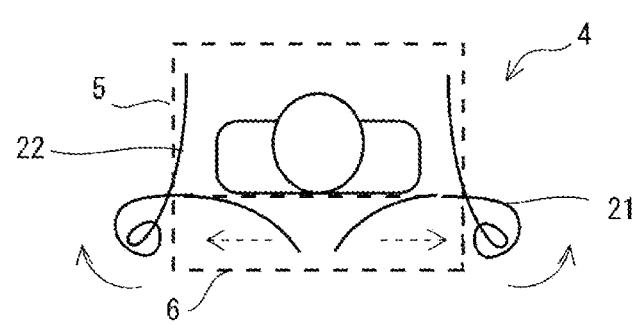
Figure 8C:
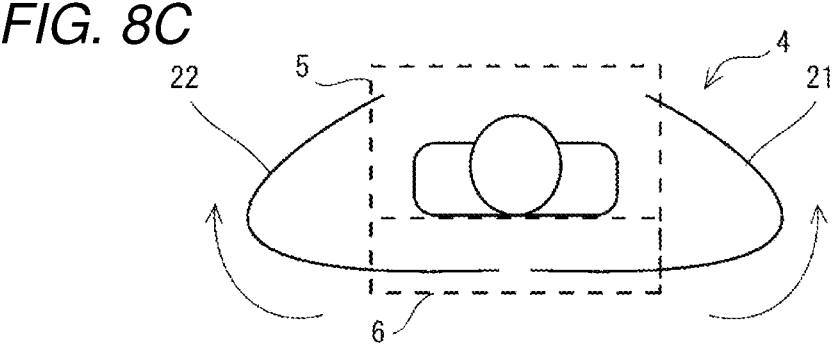

FIGS. 8A to 8C are diagrams illustrating a procedure of deploying the right bag body 21 and the left bag body 22 of FIGS. 5A to 5C.

Figure 9A:
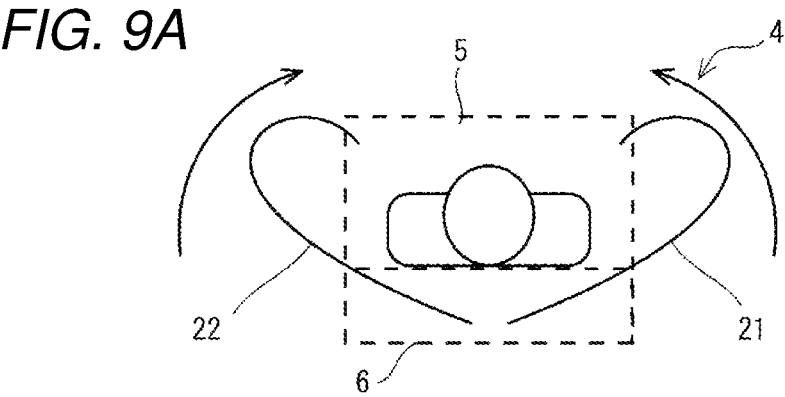
FIGS. 9A and 9B are diagrams illustrating the deploying procedure following FIGS. 8A to 8C.
Figure 9B:
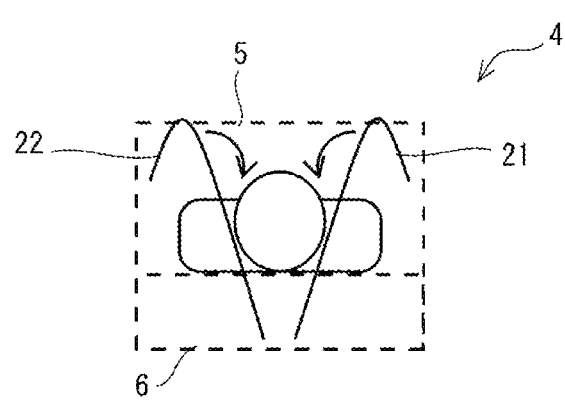

FIGS. 9A and 9B are diagrams illustrating the deploying procedure following FIGS. 8A to 8C.

FIG. 8A illustrates an accommodation state before the right bag body 21 and the left bag body 22 start to be deployed. The right bag body 21 and the left bag body 22, which are the elongated bag bodies that can be deployed in the substantially rod shape, are accommodated in the seat 4 in a state of being wound between both ends thereof. For example, the right bag body 21 and the left bag body 22 are wound rearward. When the inflator 23 ejects the high-pressure gas, the right bag body 21 and the left bag body 22 start to be deployed. The right bag body 21 and the left bag body 22 start to be deployed such that the right bag body 21 and the left bag body 22 are expanded to the right and the left of the seat 4 while being unwound.

FIG. 8B illustrates a state in which the right bag body 21 and the left bag body 22 that have started to be deployed break a right edge and a left edge of the seat 4 and begin to be deployed outward. The right bag body 21 and the left bag body 22, which have started to be deployed such that the right bag body 21 and the left bag body 22 are expanded to the right and the left while being unwound, are deployed so as to break the right edge and the left edge of the seat 4 and are further expanded to the right and the left. In addition, since the right bag body 21 and the left bag body 22, which are wound rearward, are deployed so as to be unwound, portions of the right bag body 21 and the left bag body 22 that project outward from the right side and the left side of the seat 4 are unwound, so that the entire right bag body 21 and left bag body 22 move forward of the seat back portion 6 of the seat 4.

In addition, since the right bag body 21 and the left bag body 22 are deployed with bent in this way, the right bag body 21 and the left bag body 22 can move forward of the upper body of the seated occupant without being hindered from moving forward by the upper body of the occupant seated on the seat 4 or the like.

Since the right bag body 21 and the left bag body 22 are still in a bent state at this stage, it is difficult to restrain the upper body of the occupant seated on the seat 4.

FIG. 8C illustrates a state in which the right bag body 21 and the left bag body 22 are further deployed from the state illustrated in FIG. 8B, and deployed out to the right and the left of the seat 4. As illustrated in FIG. 8C, the right bag body 21 and the left bag body 22, which are deployed so as to expand outward from the right side and the left side of the seat 4, continue to be deployed while moving forward so as to be unwound. Further, even in a state where the bent portion 31 is unwound, the right bag body 21 and the left bag body 22 move further forward due to an inertial force generated by the unwinding. The right bag body 21 and the left bag body 22 start to be deployed from the seat back portion 6 of the seat 4 either one of (i) toward the diagonal forward direction so as to be expanded forward and (ii) toward the right side and the left side of the seat 4.

FIG. 9A illustrates a state in which the right bag body 21 and the left bag body 22 are further deployed from FIG. 8C and move to the front side of the seat 4 due to the inertial force at the time of the deploying. The unwound right bag body 21 moves so as to rotate forward about the right edge of the seat 4 due to a counterclockwise inertial force. The unwound left bag body 22 moves so as to rotate forward about the left edge of the seat 4 due to a clockwise inertial force.

FIG. 9B illustrates a state in which the right bag body 21 and the left bag body 22 are further deployed from FIG. 9A and are deployed in front of the upper body of the occupant seated on the seat 4 due to the inertial force at the time of the deploying. The right bag body 21 having been moved to the front side of the occupant is moved in a left direction on the front side of the occupant, due to the counterclockwise inertial force. The left bag body 22 having been moved to the front side of the occupant is moved in a right direction on the front side of the occupant, due to the clockwise inertial force. The right bag body 21 and the left bag body 22 may be further deployed toward the center of the occupant.

Figure 10A:
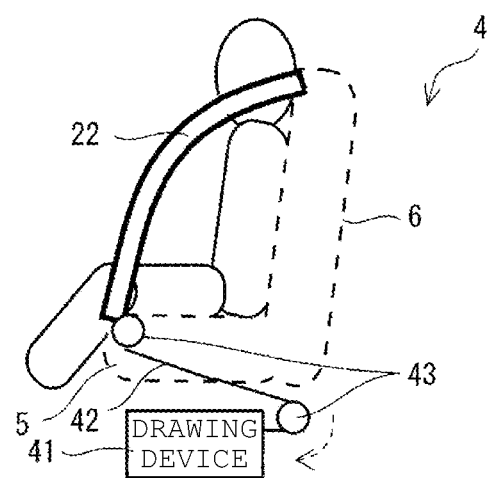
FIGS. 10A and 10B are diagrams illustrating an operation of a drawing device of FIG. 4 performed after FIGS. 9A and 9B.
Figure 10B:
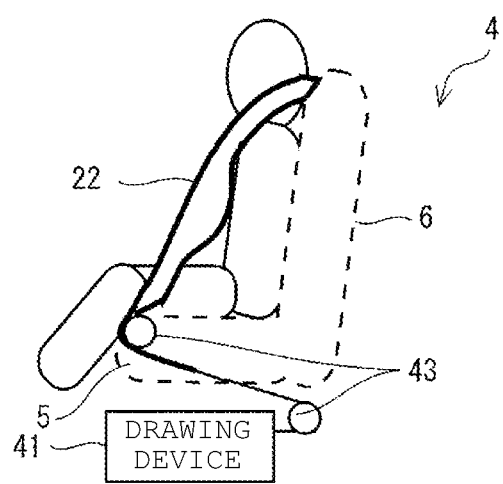

FIGS. 10A and 10B are diagrams illustrating an operation of the drawing device 41 of FIG. 4 following the state illustrated in FIGS. 9A and 9B.

In FIG. 10A, the right bag body 21 and the left bag body 22 are deployed in front of the upper body of the seated occupant as illustrated in FIG. 9B.

As illustrated in FIG. 10B, the drawing device 41 draws the tether 42 coupled to the lower end of the right bag body 21 and the tether 42 coupled to the lower end of the left bag body 22. The tethers 42 are folded back under a seat surface of the seat portion 5 of the seat 4 by plural rollers 43 that are arranged side by side under the seat portion 5 of the seat 4. The lower end of the right bag body 21 and the lower end of the left bag body 22 are drawn downward of the seat portion 5 of the seat 4. The bending of the right bag body 21 and the bending of the left bag body 22 are eliminated by the drawing device 41 drawing the right bag body 21 and the left bag body 22. The right bag body 21 and the left bag body 22 are moved so as to be pulled to positions in front of the occupant after passing above the right and left shoulders of the occupant seated on the seat 4. Then, the right bag body 21 and the left bag body 22 that are deployed with bent are in close contact with the front surface of the upper body and both shoulders of the occupant seated on the seat 4.

Figure 11A:
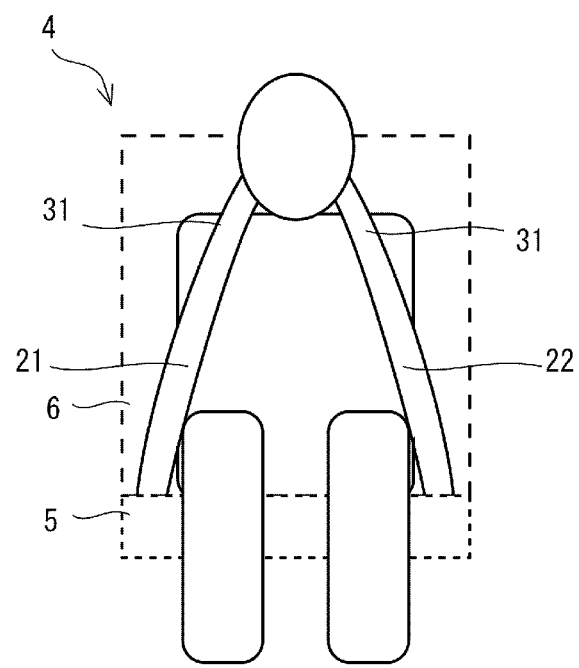
FIGS. 11A and 11B are diagrams illustrating a state of the right bag body and the left bag body after FIGS. 10A and 10B.
Figure 11B:
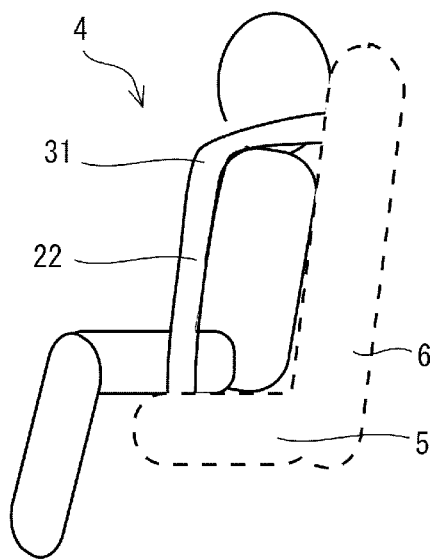

FIGS. 11A and 11B are diagrams illustrating a state of the right bag body 21 and the left bag body 22 following the state illustrated in FIGS. 10A and 10B.

FIG. 11A is a front view. FIG. 11B is a side view. In FIGS. 11A and 11B, the deployed right bag body 21 and left bag body 22 are deployed so as to be in close contact with the front surface of the upper body and both shoulders of the occupant seated on the seat 4 as in FIG. 10B.

In FIGS. 11A and 11B, the right bag body 21 is deployed so as to reach the position in front of the upper body of the occupant seated on the seat 4 from the upper right portion of the seat back portion 6 of the seat 4 through above the right shoulder of the occupant. The left bag body 22 is deployed so as to reach the position in front of the upper body of the occupant seated on the seat 4 from the upper left portion of the seat back portion 6 of the seat 4 through above the left shoulder of the occupant. The upper body of the occupant seated on the seat 4 is restrained by the right bag body 21 and the left bag body 22 that are deployed so as to be in close contact with the upper body, and is less likely to be displaced or moved back and forth, up and down, and right and left.

In this way, the right bag body 21 and the left bag body 22 are accommodated in a state of being wound with both ends thereof, which are fixed to the seat 4, located on an outside. The right bag body 21 and the left bag body 22 can move forward from the seat back portion 6 of the seat 4 due to the inertial force when being deployed so as to be unwound from the accommodated state. The right bag body 21 and the left bag body 22 can be deployed so as to reach the positions in front of the upper body of the occupant seated on the seat 4 through above the right and left shoulders of the occupant.

Further, in a state where the right bag body 21 and the left bag body 22 are deployed so as to reach the positions in front of the upper body of the occupant seated on the seat 4, the bent portion 31 of the right bag body 21 and the bent portion 31 of the left bag body 22 can be located between both right and left shoulders of the occupant seated on the seat 4.

As described above, in the embodiment, the right bag body 21 and the left bag body 22 are accommodated along the right and left side portions of the seat back portion 6 and the seat portion 5 of the seat 4 of the automobile 1. Then, each of the right bag body 21 and the left bag body 22 is deployed in a rod shape that is bent between both ends thereof fixed to the seat 4. Further, the right bag body 21 and the left bag body 22 are accommodated in the state of being wound with both ends thereof, which are fixed to the seat 4, located on the outside. Accordingly, the right bag body 21 and the left bag body 22 start to be deployed so as to be unwound from the accommodated state, and are moved forward from the seat back portion 6 of the seat 4 due to the inertial force generated by the unwinding. As a result, each of the right bag body 21 and the left bag body 22 that is deployed in the rod shape which is bent or curved between both ends thereof fixed to the seat 4 can be deployed so as to reach the position in front of the upper body of the occupant seated on the seat 4 through above both right and left shoulders of the occupant. The bag bodies are deployed in this way, so that the occupant seated on the seat 4 can be maintained in that state. For example, the occupant can be restrained so as to maintain the state of being seated on the seat 4 not only when an impact is input to the automobile 1 from a front direction, but also when an impact is input to the automobile 1 from a diagonal forward direction. In addition, the front surface of the upper body of the occupant is restrained by the right and left bag bodies. When it is attempted to protect the occupant with the seatbelt, a force that restrains the occupant may locally act a strong force on a portion of the front surface of the upper body with which the seatbelt comes into contact. However, the embodiment can reduce such a possibility.

Moreover, the deployed right bag body 21 and left bag body 22 can be moved toward the center of the front surface of the upper body of the occupant seated on the seat 4 by the inertial force of the unwinding. The right bag body 21 and the left bag body 22 that have been moved to the center of the front surface of the upper body of the occupant seated on the seat 4 can be deployed on both right and left shoulders of the occupant seated on the seat 4. The right bag body 21 and the left bag body 22 are close to or in close contact with the right and the left of the neck of the occupant seated on the seat 4. When the right bag body 21 and the left bag body 22 are close to or in close contact with the right and the left of the neck of the occupant, the head of the occupant is less likely to swing.

Due to these actions, the embodiment can implement effective occupant protection in various collisions. For example, not only in a frontal collision but also in an oblique collision and an offset collision, the right bag body 21 and the left bag body 22 can restrain the occupant such that the occupant is less likely to be displaced out of the seated position of the seat 4. Moreover, since the occupant is restrained by the right bag body 21 and the left bag body 22, the strong force is less likely to be applied locally to the occupant unlike the seatbelt. Further, since the right bag body 21 and the left bag body 22 are deployed so as to come into close contact near the upper body of the occupant at the seated position of the seat 4, the right bag body 21 and the left bag body 22 may begin to absorb the impact before the upper body of the occupant clearly moves.

In the embodiment, each of the right bag body 21 and the left bag body 22 includes the bent portion 31 between both ends thereof fixed to the seat 4. The bent portion 31 is provided at the upper position than the center that is equidistant from both ends of each of the right bag body 21 and the left bag body 22 fixed to the seat 4 so as to be located between both right and left shoulders of the occupant seated on the seat 4 in the state where, for example, each of the right bag body 21 and the left bag body 22 is deployed so as to reach the position in front of the upper body of the occupant through the position above a respective one of the right and left shoulders of the occupant seated on the seat 4. Then, each of the right bag body 21 and the left bag body 22 are accommodated in a state of being wound from the bent portion 31 such that the bent portion 31 is located on the inside. Each of the right bag body 21 and the left bag body 22 is accommodated in a state of being wound rearward from a state of being expanded to the right side and the left side of the seat 4 such that both ends thereof are located on the outside. Then, the right bag body 21 and the left bag body 22 start to be deployed so as to be unwound from the accommodated state, and are moved forward from the seat back portion 6 of the seat 4 due to the inertial force generated by the unwinding. As a result, the bent portions 31 can be deployed to reach the positions in front of the upper body of the occupant seated on the seat 4.

The above embodiment is a mere example of the disclosure. It is noted that the disclosure is not limited to the above embodiment. Various modifications and changes may be made without departing from the gist of the disclosure.

For example, in the above embodiment, one bent portion 31 is provided for each of the right bag body 21 and the left bag body 22.

In addition, for example, plural bent portions 31 may be provided for each of the right bag body 21 and the left bag body 22.

In the above embodiment, the bent portion 31 is provided at the upper position than the center of both ends of each of the right bag body 21 and the left bag body 22.

Alternatively, for example, the bent portion 31 may be provided at the center of both ends of each of the right bag body 21 and the left bag body 22.

In the above embodiment, each of the right bag body 21 and the left bag body 22 has the substantially rod shape bent at the bent portion 31.

Alternatively, for example, each of the right bag body 21 and the left bag body 22 may have the substantially rod shape as a whole between both ends thereof.

In the above embodiment, the right bag body 21 and the left bag body 22 are accommodated in the seat 4 in the state of being wound rearward such that both ends are located on the outside from the state of being expanded to the right side and the left side of the seat 4.

Alternatively, for example, the right bag body 21 and the left bag body 22 may be accommodated in the seat 4 in a state of being wound forward such that both ends thereof are located on the outside from the state of being expanded to the right side and the left side of the seat 4.

Figure 12A:
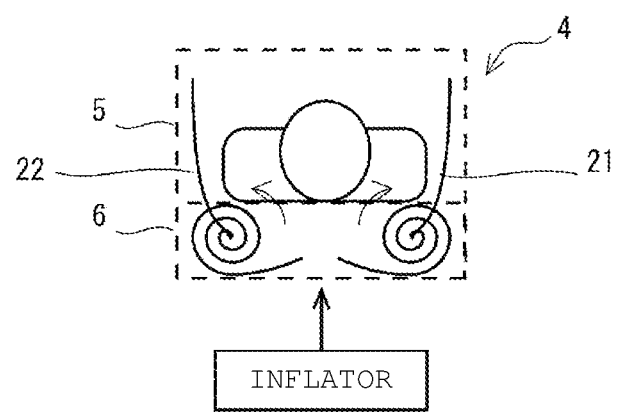
FIGS. 12A to 12C are diagrams illustrating a modification of a method for deploying the right bag body and the left bag body of FIGS. 5A to 5C.
Figure 12B:
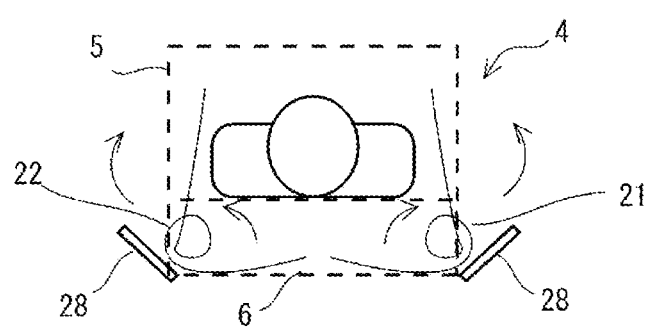
Figure 12C:
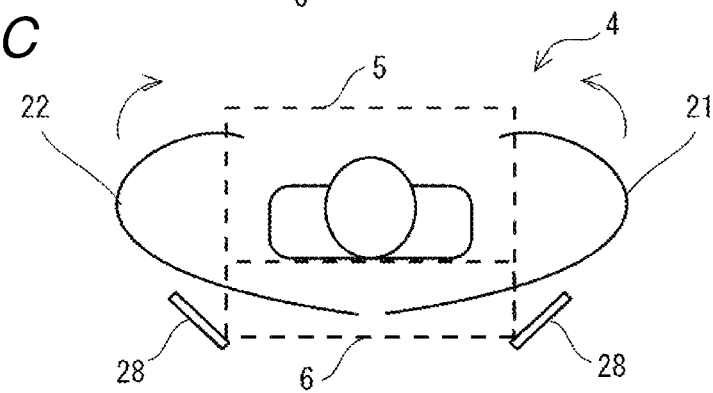

FIGS. 12A to 12C are diagrams illustrating a modification of a method for deploying the right bag body 21 and the left bag body 22 of FIGS. 5A to 5C. FIGS. 12A to 12C correspond to FIGS. 8A to 8C.

FIG. 12A illustrates an accommodation state before the right bag body 21 and the left bag body 22 according to the modification are deployed. The right bag body 21 is accommodated in the state of being wound counterclockwise, and the left bag body 22 is accommodated in the state of being wound clockwise. In this way, the right bag body 21 and the left bag body 22 are provided on the seat 4 in the state of being wound forward. When the inflator 23 ejects the high-pressure gas, the right bag body 21 and the left bag body 22 start to be deployed. The right bag body 21 and the left bag body 22 start to be deployed so as to be expanded to the right and the left while being unwound. The right bag body 21 and the left bag body 22 project from the right and left edges of the seat 4 as illustrated in FIG. 12B. The right bag body 21 and the left bag body 22 come into contact with regulation plates 28 and are rebounded forward. As illustrated in FIG. 12C, the unwound right bag body 21 and the unwound left bag body 22 are moved forward due to the inertial force at the time of deploying.

As in FIGS. 7A to 7E, the right bag body 21 and the left bag body 22 provided on the seat 4 in the state of being wound forward can be moved forward of the upper body of the seated occupant by the force of deploying.

In the above embodiment, each of the right bag body 21 and the left bag body 22 has the substantially rod shape bent at the bent portion 31.

Alternatively, for example, the right bag body 21 and the left bag body 22 may have a wide portion wider than the other parts (for example, both ends). The wide portion may bulge like the other parts of the right bag body 21. In this case, the right bag body 21 and the left bag body 22 may be wound from the wide portion instead of the bent portion 31. Since the wide portion is wider than the other parts, the wide portion is heavier than the other parts. By winding the right bag body 21 and the left bag body 22 from the wide portions heavier than other parts, the right bag body 21 and the left bag body 22 can be expanded using the wide portions as weights. In particular, when the bent portion 31 is wide, it is considered that the bent portion 31 which is widened and heavy can be properly deployed up to the end.

An occupant protection device for a vehicle according to the embodiment includes a right bag body, a left bag body, and an inflator. The right bag body and the left bag body are accommodated along at least both right and left side portions of a seat back portion of a seat of the vehicle. Each of the right and left bag bodies is configured to be deployed between both ends thereof fixed to the seat. The inflator is configured to deploy the right bag body and the left bag body. Each of the right bag body and the left bag body is accommodated in a state of being wound with both ends thereof, which are fixed to the seat, located. The right bag body and the left bag body are configured to be unwound from a state of being accommodated such that the right bag body and the left bag body are deployed to reach positions in front of an upper body of an occupant seated on the seat.

Each of the right bag body and the left bag body may include a bent portion between both ends thereof fixed to the seat. Each of the right bag body and the left bag body may be accommodated in the state of being wound with the bent portion thereof located inside. Each of the right bag body and the left bag body may be configured to be deployed such that the bent portion thereof reaches the positions in front of the upper body of the occupant seated on the seat.

The bent portion is provided at either one of (i) a center, equidistant from both ends fixed to the seat, of each of the right bag body and the left bag body and (ii) the upper position than the center.

In the state in which the right bag body and the left bag body are deployed so as to reach the positions in front of the upper body of the occupant seated on the seat, the bent portions may be located between both right and left shoulders of the occupant seated on the seat.

Each of the right bag body and the left bag body may be accommodated in a state of being wound from the bent portion thereof.

Each of the right bag body and the left bag body may be accommodated in the state of being wound rearward from a state of being expanded to a right side and a left side of the seat such that both ends thereof are located outside.

The right bag body and the left bag body may each include a wide portion wider than both ends thereof at a position wound innermost.

The invention claimed is:

1. An occupant protection device for a vehicle, the occupant protection device comprising:
   a right bag body and a left bag body, the right and left bag bodies being accommodated along at least both right and left side portions of a seat back portion of a seat of the vehicle, each of the right and left bag bodies being configured to be deployed between both ends thereof fixed to the seat; and
   an inflator configured to deploy the right bag body and the left bag body,
   wherein, while being accommodated along at least both of the right and left side portions of the seat back portion of the seat of the vehicle, each of the right bag body and the left bag body comprises a bent portion between the both ends,
   wherein the right bag body is accommodated in the seat back portion i) in a state where the right bag body is wound with the both ends located outside and the bent portion located inside and ii) in a state where the right bag body is wound clockwise from the both ends to the bent portion when viewed from above,
   wherein the left bag body is accommodated in the seat back portion i) in a state where the left bag body is wound with the both ends located outside and the bent portion located inside when viewed from above and ii) in a state where the left bag body is wound counterclockwise from the both ends to the bent portion when viewed from above, and
   wherein the right bag body and the left bag body are configured to be deployed in such a manner that the right bag body and the left bag body are unwound from a state of being accommodated to reach positions in front of an upper body of an occupant to be seated on the seat.

2. The occupant protection device according to claim 1, wherein
   each of the right bag body and the left bag body is configured to be deployed such that the bent portion thereof reaches the positions in front of the upper body of the occupant seated on the seat.

3. The occupant protection device according to claim 2, wherein the bent portion is provided at either one of:
   a center of each of the right bag body and the left bag body, the center being equidistant from the both ends fixed; and
   an upper position than the center.

4. The occupant protection device according to claim 2, wherein each of the right bag body and the left bag body is accommodated in a state of being wound from the bent portion thereof.

5. The occupant protection device according to claim 3, wherein each of the right bag body and the left bag body is accommodated in a state of being wound from the bent portion thereof.

6. The occupant protection device according to claim 1, wherein a length of the right bag body after the inflator deploys the right bag body to break a seat cover of the seat and projecting out of the seat is longer than a direct distance from an upper right portion of the seat back portion of the seat to a front right portion of the seat portion to which two ends of the right bag body are respectively fixed, and
   wherein the inflator deploys the right bag body with a length longer than the direct distance between the two fixed points of the right bag body.

7. The occupant protection device according to claim 1, wherein a length of the left bag body after the inflator deploys the left bag body to break a seat cover of the seat and projecting out of the seat is longer than a direct distance from an upper left portion of the seat back portion of the seat to a front left portion of the seat portion to which two ends of the left bag body are respectively fixed, and
   wherein the inflator deploys the left bag body with a length longer than the direct distance between the two fixed points of the left bag body.

8. The occupant protection device according to claim 1, wherein the end of the right bag body and the end of the left bag body face each other when accommodated in the seat portion of the seat.

9. An occupant protection device for a vehicle, the occupant protection device comprising:
   a right bag body and a left bag body, the right and left bag bodies being accommodated along right and left side portions of a seat of the vehicle, the seat comprising a seat back portion and a seat portion, each of the right and left bag bodies being fixed to an upper portion of the seat back portion at an upper end, each of the right and left bag bodies being fixed to a front portion of the seat portion at a lower end, each of the right and left bag bodies being configured to be deployed between the upper end and the lower end; and an inflator configured to deploy the right bag body and the left bag body, wherein, while being accommodated along the right and left side portions of the seat, each the right bag body and the left bag body comprises a bent portion between the upper ends and the lower ends, wherein a part of the right bag body is accommodated in the seat back portion i) in a state where the right bag body is wound with the upper end located outside and the bent portion located inside and ii) in a state where the right bag body is wound clockwise from the upper end to the bent portion when viewed from above, wherein a part of the left bag body is accommodated in the seat back portion i) in a state where the left bag body is wound with the upper end located outside and the bent portion located inside and ii) in a state where the left bag body is wound clockwise from the upper end to the bent portion when viewed from above, and wherein the right bag body and the left bag body are configured to be deployed, after the right bag body and the left bag body expand outward from the right and the left sides of the seat from a state of being accommodated, to reach positions in front of an upper body of an occupant to be seated on the seat due to an inertial force generated by unwinding of the wounded parts of the right and the left bag bodies.

10. The occupant protection device according to claim 9, further comprising a drawing device configured to draw the lower ends of the right and left bag bodies downward of the seat portion after the right and left bag bodies are deployed.

\* \* \* \* \*